United States Patent [19]
Jones et al.

[11] Patent Number: 5,161,379
[45] Date of Patent: Nov. 10, 1992

[54] COMBUSTOR INJECTOR FACE PLATE COOLING SCHEME

[75] Inventors: Gregg W. Jones, Royal Palm Beach; J. Britt Ingram, Lake Park; Lee E. Hansen, Palm Beach Gardens, all of Fla.

[73] Assignee: United Technologies Corporation, Hartford, Conn.

[21] Appl. No.: 812,320

[22] Filed: Dec. 23, 1991

[51] Int. Cl.⁵ ............................ F23R 3/20; F02C 7/22
[52] U.S. Cl. ........................................ 60/740; 60/258; 431/328; 239/132.5; 239/424.5; 239/558
[58] Field of Search ............... 60/740, 742, 752, 756, 60/746, 754, 258; 431/326, 328, 354; 239/558, 132.5, 411.5, 411.4, 424.5, 423, 424

[56] References Cited

U.S. PATENT DOCUMENTS

| | | | |
|---|---|---|---|
| 1,040,986 | 10/1912 | Bastian | 431/284 |
| 2,911,035 | 11/1959 | Nieman et al. | 431/354 |
| 3,071,925 | 1/1963 | Ledwith et al. | 60/258 |
| 3,204,682 | 9/1965 | Teleshefsky et al. | 431/354 |
| 3,504,994 | 7/1970 | Desty et al. | 431/328 |
| 3,870,459 | 3/1975 | Desty et al. | 431/328 |
| 4,437,831 | 3/1984 | Brooker et al. | 239/424.5 |
| 4,443,228 | 4/1984 | Schlinger | 239/427.5 |
| 4,850,537 | 7/1989 | Gourdine | 239/424.5 |
| 4,887,963 | 12/1989 | LeMer | 431/328 |
| 4,914,918 | 4/1990 | Sullivan | 60/756 |

FOREIGN PATENT DOCUMENTS

| | | | |
|---|---|---|---|
| 186203 | 9/1922 | United Kingdom | 239/558 |
| 1003883 | 9/1965 | United Kingdom | 60/740 |

Primary Examiner—Richard A. Bertsch
Assistant Examiner—Timothy S. Thorpe
Attorney, Agent, or Firm—Christopher T. Hayes

[57] ABSTRACT

A combustor element face plate made of a thermally highly conductive material, such as copper, has a plurality of cooling holes extending therethrough. Some of the cooling holes are located about the injector openings, while other cooling holes are located adjacent the peripheral edge of the face plate.

6 Claims, 2 Drawing Sheets

COMBUSTOR INJECTOR FACE PLATE COOLING SCHEME

The invention was made under a U.S. Government contract and the Government has rights herein.

TECHNICAL FIELD

This invention relates to oxidizer-fuel combustor injectors in propulsion systems such as liquid fueled rockets.

BACKGROUND OF THE INVENTION

Oxidizer-fuel combustor injectors such as the type typically used on hydrogen fueled rockets typically operate at low oxidizer-to-fuel ratios. During use, these injectors reach extremely high temperatures which are detrimental to the injector. Therefore, the firing time for these injectors must be limited unless the injectors are somehow cooled.

The most common method of cooling the injectors is to provide a porous metal face place which is transpiration cooled by fuel seeping through the interstices of the face plate. This works well for fuel rich injectors, since the transpiring fuel does not combust at the surface of the face plate but instead migrates into the combustion chamber before igniting.

Developments in combustion systems have lead to combustor injectors which operate at high oxidizer-to-fuel ratios. For these injectors, the normal density porous metal face plate leaks too much flow. If the porous metal is packed denser it is difficult to maintain an even porosity, resulting in uneven distribution of the transpiration cooling flow. Additionally, when the injector elements are brazed into the porous metal, the braze material wicks into the porous metal and blocks its passages.

What is needed is a cooled face plate for high oxidizer-fuel ratio gas injectors.

SUMMARY OF THE INVENTION

It is therefore an object of the present invention to provide a cooled face plate for high oxidizer-fuel ratio gas injectors in which the desired porosity can be obtained.

Another object of the present invention is to provide a cooled face plate which is not subject to detrimental wicking of the braze material into the face plate during brazing of the oxidizer injector elements thereto.

According to the present invention, a combustor injector face plate is provided having a plurality of injector openings and a plurality of coolant holes extending therethrough. The face plate is a thin sheet of material having a high thermal conductivity. Fuel flowing through each of the coolant holes provides localized cooling of the face plate. The coolant holes are located in the face plate in a pattern and density which provide the desired cooling of the face plate. Additionally, the coolant holes are spaced from the injector openings an adequate distance to prevent braze material from wicking into the coolant holes during brazing of the oxidizer injectors into the face plate.

The foregoing and other features and advantages of the present invention will become more apparent from the following description and accompanying drawings.

BEST MODE FOR CARRYING OUT THE INVENTION

Figure 1:
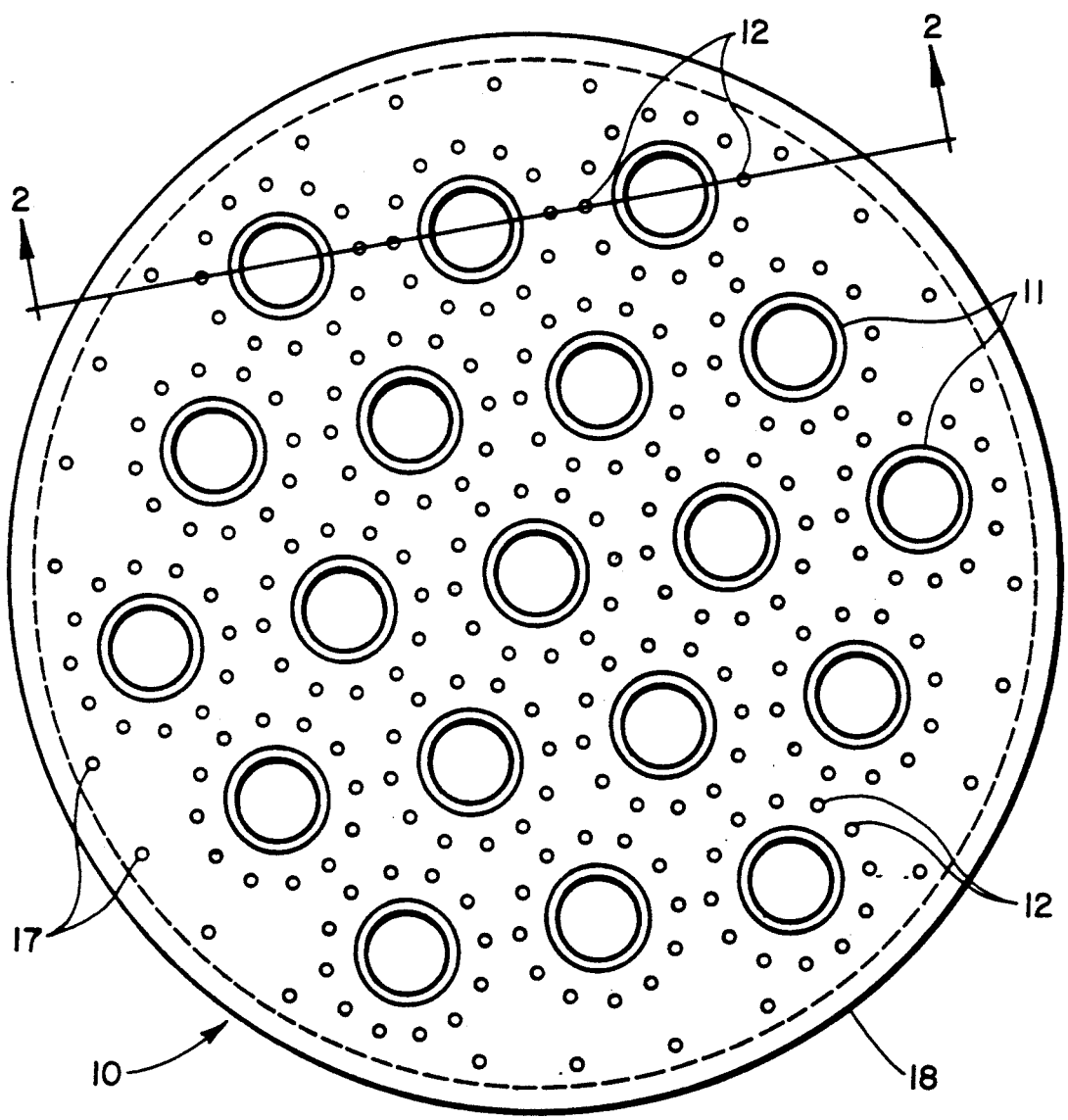
FIG. 1 is a plan view of the face plate of the present invention.
Figure 2:
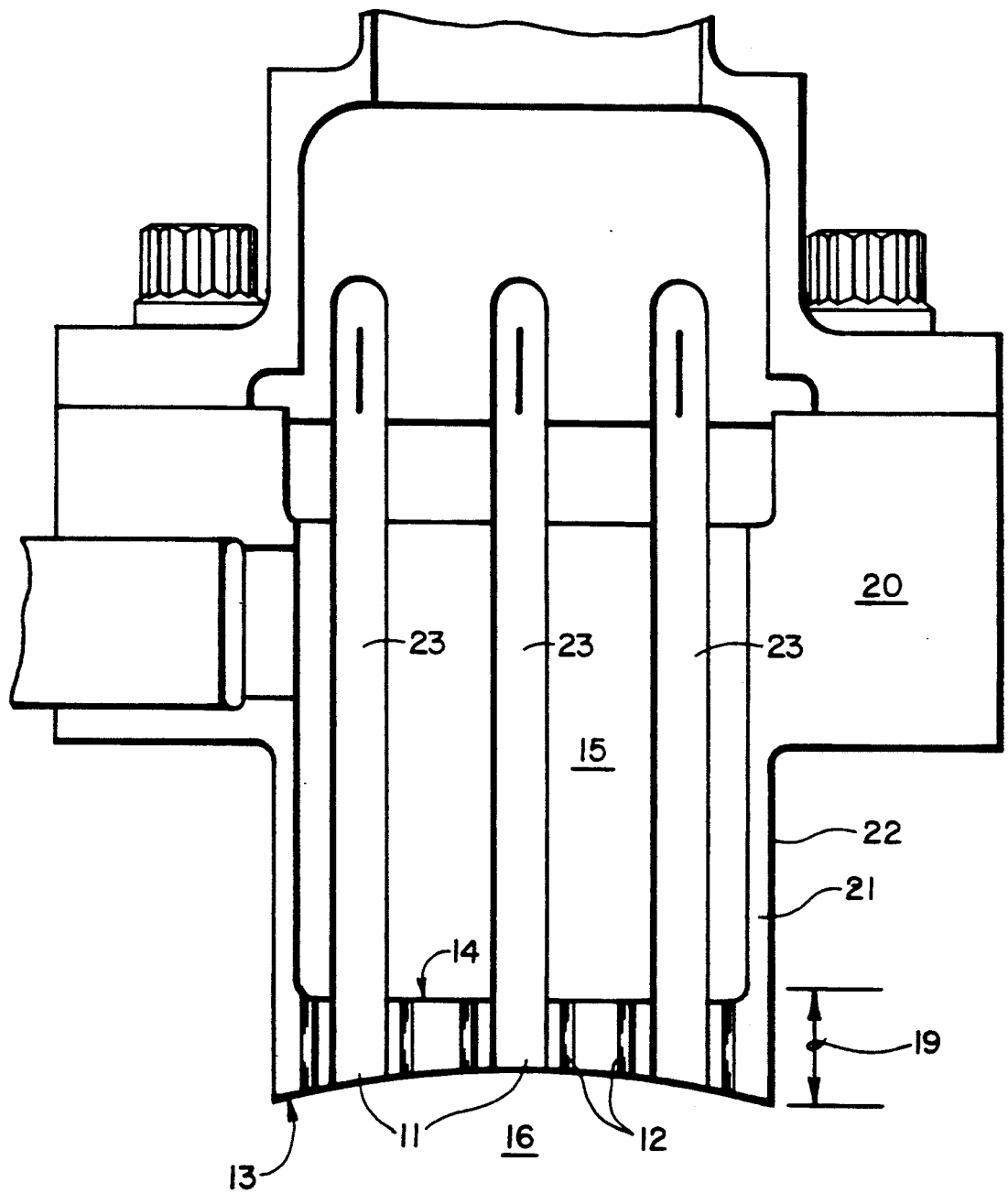
FIG. 2 is a cross-sectional view of the face plate of the present invention taken along line 2—2 of FIG. 1.

As shown in FIG. 1, the face plate 10 of the present invention includes a plurality of injector openings 11 between which are interposed coolant holes 12. The injector openings are preferably spaced in a hexagonal pattern as shown in FIG. 1 to minimize the space therebetween. Spaced radially outward of each injector opening 11 are a plurality of cooling holes 12, as shown in FIG. 2. Each cooling hole extends from the outer surface 13 of the face plate 10 to the inner surface 14 thereof. Cooling holes 12 are located adjacent each of the injector openings 11, and are equally spaced about the injector openings 11 for delivering fuel through the face plate 10 to provide cooling thereof. Additionally, these cooling holes act as fuel injector ports, providing fuel to the combustion chamber 16, as will be appreciated by those skilled in the art.

The fuel volume 15 of the combustor injector thus communicates with the combustion chamber 16 solely through the cooling holes 12. Additional cooling holes 17 are located adjacent the peripheral edge 18 of the face plate 10 to provide any additional cooling which may be needed. These additional cooling holes 17 may be somewhat larger than the cooling holes 12 to meet the higher cooling requirements of the face plate 10 adjacent the peripheral edge 18 thereof.

The face plate 10 preferably has a thickness 19 of 0.2 inches. This thickness provides sufficient heat transfer from the face plate 10 to fuel flowing through the cooling holes 12, 17 to effectively cool the face plate 10. The face plate 10 is preferably made of a thermally highly conductive material, such as copper, to further enhance heat transfer from the outer surface 13 to the cooling holes 12, 17. The face plate 10 is secured to the injector body 20 by a sidewall 21. The sidewall 21 is preferably 0.040 inches thick so that the outer face 22 thereof can be conductively cooled by the fuel in the fuel volume 15. The sidewall 21 is structurally reinforced by the oxidizer injectors 23 which extend between the injector body 20 and the face plate 10.

Each oxidizer injector 23 is brazed to the face plate 10 within one of the injector openings 11. The present invention overcomes the problems inherent in face plates of the prior art. As those skilled in the art will readily appreciate, the present invention is not subject to any significant wicking during the brazing of the oxidizer injectors 23. The present invention can be tailored to provide desired cooling on any portion of the outer surface 13 thereby providing for combustor injector run times which are not limited by excessively high temperatures, due to the cooled face plate 10 of the present invention.

Although this invention has been shown and described with respect to a detailed embodiment thereof, it will be understood by those skilled in the art that various changes in form and detail thereof may be made without departing from the spirit and scope of the claimed invention.

We claim:

1. A face plate for protecting components of a combustor injector from excessively high temperatures, said face plate comprising:

a thin plate of a thermally highly conductive material secured to said injector, said plate having an inner surface, an outer surface having a peripheral edge, a plurality of injector openings extending from said inner surface to said outer surface through said plate, each opening having an oxidizer injector fixedly received therein, a plurality of first cooling holes extending from said inner surface to said outer surface through said plate, each of said first cooling holes located adjacent one of said openings and equally spaced thereabout for delivering cooling fluid through the plate to cool said plate, said first cooling holes spaced equidistant from said adjacent opening, and a plurality of second cooling holes extending from said inner surface to said outer surface through said plate, each of said second cooling holes located adjacent the peripheral edge for delivering cooling fluid through the plate to cool said plate adjacent the peripheral edge.

2. The face plate of claim 1 wherein each oxidizer injector is brazed into the opening in which the injector element is received.

3. The face plate of claim 2 wherein said openings form a hexagonal pattern on the outer surface of the plate.

4. The face plate of claim 3 wherein the cooling fluid is a fuel.

5. The face plate of claim 4 wherein thickness of the plate between the inner and outer surfaces is 0.2 inches.

6. The face plate of claim 5 wherein the plate is made of copper.

* * * * *